Sept. 6, 1949.  E. RONAI  2,480,968
VARIABLE TRANSMISSION MEANS
Filed Oct. 15, 1945
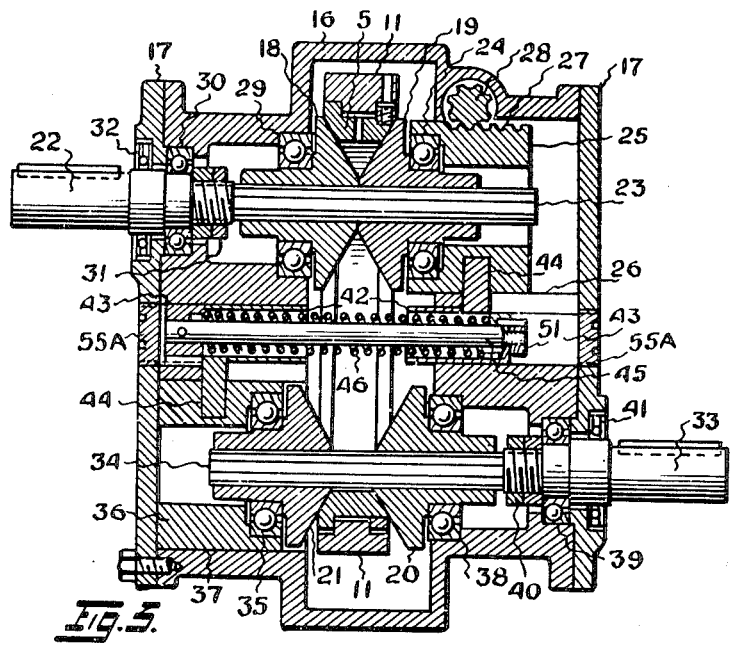
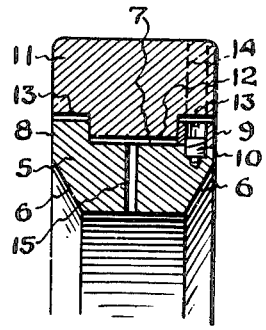
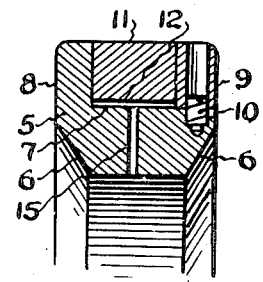
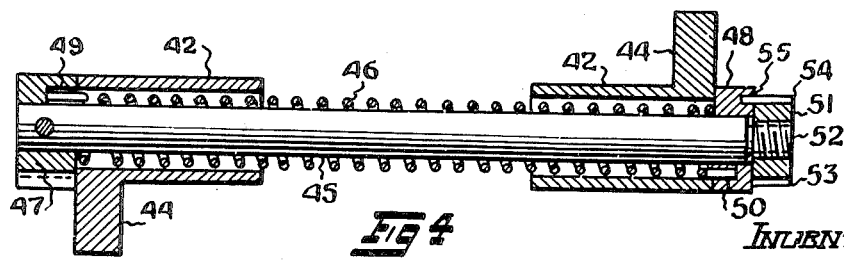

Patented Sept. 6, 1949

2,480,968

UNITED STATES PATENT OFFICE 2,480,968

VARIABLE TRANSMISSION MEANS

Ernest Ronai, Woollahra, near Sydney, New South Wales, Australia

Application October 15, 1945, Serial No. 622,428
In Australia August 30, 1944

8 Claims. (Cl. 74—193)

This invention relates to variable friction gear transmission means of the type known as the variable stepless type wherein a rigid friction ring is used for transmitting motion from one pair of bevelled members or discs to a second pair of such members. In the known constructions of this type the rigid friction ring represents quite an appreciable moment of inertia, which although necessary for the transmission of the drive or power, becomes detrimental as soon as the drive or the load is cut off, as its momentum (that is fly wheel effect) causes certain unnecessary wear on the comical friction surfaces of the bevelled members or discs.

The present invention has been devised to provide simple and efficient means for obtaining suitable ratios between a driving and driven shaft in a quick and easy manner and wherein the amount of moment of inertia on cessation of the drive or the load is reduced to a considerable extent, thereby largely obviating the disability above set out. Furthermore, adjustment for wear can be readily made.

According to this invention the variable transmission means comprise a friction ring transmission member consisting of an inner ring having internal friction bearing surfaces and an outer ring slidably rotatably mounted on the said inner ring and retained in position against endwise or sideward movement, such outer ring being adapted for engagement with the inner ring on deformation of the latter on taking the drive or load. There is provision for lubrication of the rings.

The inner ring engages by means of the internal or side bevels at either side a pair of bevel members or discs one pair of which on one side engage the said ring and are mounted on a power transmission or input shaft while a second pair of bevel members or discs on the opposite side are mounted on a second or output shaft, and the diagonally opposite members of the two pairs are laterally slidably mounted in position while the other two members are laterally fixed.

Means are provided for advancing the slidable members of each set to and from the ring member to vary the drive ratio and such means are operatively connected to a common control point.

In certain constructions take-up mechanism is associated with the bevel members or discs to compensate automatically for any possible play within the unit, to maintain the relative position of the said bevel members in desired relationship and the unit constituted of the above parts may be enclosed in a suitable housing embodying an oil bath.

In order to describe the invention more fully reference will be made to the drawings accompanying and forming part of this complete specification and wherein:

Figure 1 is a fragmentary sectional elevation of one form of the transmission ring member, and Figure 2 is a similar view of a modified construction.

Figure 3 is a sectional elevation of a complete unit according to the invention, while Figure 4 is a sectional elevation of actuating means with take-up mechanism.

The friction ring transmission as shown in Figure 1 consists of an inner ring 5 which has side bevel surfaces 6 and a peripheral bearing surface 7 at one side edge of which a flange 8 is arranged while at the other side a retention or set collar 9 is adapted to fit into position and is retained in place by a grub screw 10. If required a series of affixing screws 10 may be fitted at spaced intervals about the circumference. Upon the inner ring 5 an outer sliding ring 11 is mounted by a shaped underside 12 between the flange 8 and set collar 9 and the side edges of said underside 12 are recessed at 13 to fit over said flange 8 and set collar 9. An orifice 14 is provided in the outer ring 11 so as to provide access to the grub screw 10. The clearance between the inner and outer rings 5 and 11 is such that the deformation under load of said inner ring 5 is such that it effects locking engagement between the latter ring 5 and the said outer ring 11 and release of the load or drive allows the said outer ring 11 to slide freely on the said inner ring 5 until the momentum is exhausted as later described.

One or more lubricating holes 15 is or are provided in the inner ring 5.

Referring to Figure 2 the flange 8 of the inner ring 5 is extended out to the periphery of the outer ring 11, and the set collar 9 is similarly extended. The grub screw 10 may also be extended.

The transmission member 5—15 is housed within a suitable casing 16 (having removable end plates 17) mounted between and in contact with two pairs of bevel members respectively numbered 18 and 19, and 20 and 21. The pair of bevel members 18 and 19 are mounted on input or transmission shaft 22, the cone 19 being fixed to rotate with said shaft 22 but being movable therealong on a splined formation at 23 and a bearing and thrust race 24 is fitted at the back in a rack sleeve 25 mounted concentric with the shaft 22 in a guide recess 26 in which it is slidable. A toothed rack 27 is formed in the upper portion of the sleeve and an adjustment pinion 28 mounted in the casing 16 meshes therewith and forms the operative connexion with a control lever or other suitable means for operation.

The other bevel member 18 of the pair is mounted in place by a bearing race 29 fitting in the casing 16 and rotates in a fixed position with the shaft 22 which latter has a bearing race 30 fitted thereon with thrust adjusting nuts 31 on the said shaft 22 inwardly of the said bearing 30 and an oil seal 32 is arranged in a housing in the end plates 17.

The bevel member 21 is mounted in a slidable manner upon and rotatable with a power output shaft 33 parallel with the input shaft 22 in a similar manner to that before described as upon a splined shaft portion 34 and has mounting and thrust race 35 in a sleeve 36 slidably housed in a guide recess 37. The other bevel member 20 is mounted in a similar manner to the bevel member 18 that is rotatable with its shaft 33 but laterally fixed and having a retaining bearing race 38 fitted in an internal extension in the casing 16.

The output shaft 33 has a mounting bearing 39, thrust adjustment nuts 40 and oil seal 41.

Although both the bevel members 18 and 20 have been shown as splined onto their respective shafts they can be mounted in a rotatably free manner by bushes on their said shafts so as to further eliminate friction.

To advance and retire the slidable bevel discs 19 and 21 a pair of slide blocks 42 are slidably positioned in recesses 43 in the casing 16 and each have a lug 44 engaging in the related sleeves 25 and 36 and such blocks 42 are set on a spindle 45 over a torsion spring 46 which is sleeved on said spindle between collars 47 and 48. The collar 47 is pinned to the spindle prevented against rotation in recess 43 by a key or other suitable means and has a hole 49 in its inner face in which one end of the torsion spring 44 is engaged, while the other end of the said spring 44 is adapted to be engaged in a hole 50 provided in the back of the collar 48. A locking nut 51 screws on the reduced spindle end 52 and has a series of slots 53 in its edge by means of which the collar 48 is locked in place at a setting by a pin 54 passing into any of a series of locking holes 55 provided in the front of the collar 48.

There are access holes in the casing 16 opposite the shaft ends closed by caps 55A.

The casing 16 is adapted to contain oil so that the parts are effectively lubricated at all times.

In the construction described the torsion spring 46 automatically takes up any slackness and the spindle 45 passing through the slide blocks 42 without being rigidly and directly connected thereto does not cause any twisting of said blocks 42 and no cornering effect is caused between the sleeves particularly the rack-sleeve 25 and the shifting pinion 28 and therefore the operation of the said sleeve 25 for variations of speed is smooth and easier in effect.

The anchorage of the torsion spring enables adjustment from either side of the casing 16 through the holes closed by caps 55 according the side upon which the collar 48 and nut 51 are positioned.

In operation the input shaft 22 revolving the drive is conveyed through the bevel members 18 to the inner ring 5 of the transmission ring and thence to the second pair of bevel members 20 and 21. In taking the drive the mentioned inner ring 5 is deformed and engages the outer ring 11 and the latter revolves and the whole has the effect of a single ring. On the load or drive being cut off the engagement between the rings 5 and 11 is freed and the outer ring continues to revolve without effect upon the inner ring which quickly comes to rest and thereby does not cause undue wear upon the bevel members and the contact area of the inner ring itself.

It is to be understood that although certain of the shafts in Figure 3 have been designated the input and the output shafts such order may be reversed and this is a matter governed by individual requirements.

The friction transmission ring member has been shown and described as being in two parts the outer ring 11 may be divided into several parts although no advantage can be seen in such an alteration. In the construction of such ring member it is preferred however, to have the bulk of the metal constituted of the two rings embodied in the outer ring 11.

I claim:

1. Variable friction gear transmission of the type wherein a driving shaft and a driven shaft are provided with pairs of bevel members or discs arranged to contact a friction ring transmission member, comprising a slidable friction ring transmission member consisting of an inner ring having provision for contact with the bevel members or discs, and an outer ring portion slidably rotatably mounted on the said inner ring, and adapted to engage and lock to and revolve with said inner ring upon deformation of said inner ring when the drive is taken or load received, a relaxation or complete cessation of the driving power or the load causing the said outer ring to be disengaged and to continue in revolution until the momentum is exhausted.

2. Variable friction gear transmission according to claim 1 wherein the inner ring has a bevel facing formed inwardly of each of the side faces thereof and extending to the inner circumferential portion of said ring, and having the outer peripheral face formed to provide a mounting for the outer ring.

3. Variable friction gear transmission according to claim 1 wherein the outer ring is retained in place by a flange at one side extending from the inner ring member, and a removable collar at the other side, and having set screw means or the like to affix said removable collar in place upon and to the said inner ring.

4. Variable friction gear transmission as defined in claim 1, wherein the outer ring is retained in place by a flange at one side extending from the inner ring member and a removable collar at the other side, the outer ring overlying said flange and said collar at either side, such sides being recessed to form cavities wherein the said flange and said collar take while the base of the outer ring fits therebetween over the inner ring periphery with suitable clearance between the facing and adjacent parts.

5. Variable friction gear transmission as defined in claim 1, wherein the outer ring is retained in place by a flange at one side extending from the inner ring member and a removable collar at the other side, said flange and said collar extending to the outer surface of the outer ring, and set screw means or the like for affixing said collar in place upon and to the said inner ring.

6. Variable friction gear transmission as defined in claim 1, wherein the outer ring is retained in place by a flange at one side extending from the inner ring member and a removable collar at the other side, the outer ring overlying said flange and said collar at either side, such sides being recessed to form cavities wherein the said flange and said collar take while the base of the outer ring fits therebetween, and set screw means or the like for affixing said collar in place upon and to the said inner ring, one or more holes being provided in the outer ring to give access to the set screw retaining means.

7. Variable friction gear transmission according to claim 1 wherein one or more lubrication holes is or are provided through the inner ring from its under side to its periphery wherein the outer ring is mounted.

8. Variable friction gear transmission according to claim 1 wherein the bulk of the metal constituted of the two rings is contained within the outer ring.

ERNEST RONAI.

REFERENCES CITED

The following references are of record in the file of this patent:

UNITED STATES PATENTS

| Number | Name | Date |
| --- | --- | --- |
| 2,089,003 | Sack | Aug. 3, 1937 |
| 2,199,491 | Heynav | May 7, 1940 |